(12) United States Patent
Ottesen et al.

(10) Patent No.: US 7,027,263 B2
(45) Date of Patent: Apr. 11, 2006

(54) APPARATUS FOR LOOK-AHEAD THERMAL SENSING IN A DATA STORAGE DEVICE

(75) Inventors: Hal Hjalmar Ottesen, Rochester, MN (US); Gordon James Smith, Rochester, MN (US); Sri M. Sri-Jayantha, Ossining, NY (US)

(73) Assignee: Hitachi Global Storage Technologies Netherlands B.V., (NL)

( * ) Notice: Subject to any disclaimer, the term of this patent is extended or adjusted under 35 U.S.C. 154(b) by 353 days.

(21) Appl. No.: 10/140,408

(22) Filed: May 7, 2002

(65) Prior Publication Data

US 2003/0210488 A1 Nov. 13, 2003

(51) Int. Cl.
*G11B 5/02* (2006.01)

(52) U.S. Cl. ............... 360/234.4; 360/235.7; 360/128; 360/31; 360/69; 360/25; 360/46

(58) Field of Classification Search ........... 360/46, 360/75, 69, 60, 25, 31, 97.02, 128, 234.4, 360/234.7, 234.8, 234.9, 235.7; 374/185; 324/210, 212, 185

See application file for complete search history.

(56) References Cited

U.S. PATENT DOCUMENTS

| | | | | |
|---|---|---|---|---|
| 4,669,011 A | * | 5/1987 | Lemke | 360/75 |
| 5,455,730 A | * | 10/1995 | Dovek et al. | 360/317 |
| 5,721,457 A | | 2/1998 | Sri-Jayantha | 307/119 |
| 5,739,972 A | | 4/1998 | Smith et al. | 360/77.03 |
| 5,751,510 A | | 5/1998 | Smith et al. | 360/67 |
| 5,838,514 A | | 11/1998 | Smith et al. | 360/75 |
| 5,872,676 A | | 2/1999 | Smith et al. | 360/77.03 |
| 5,901,001 A | * | 5/1999 | Meyer et al. | 360/25 |
| 5,991,113 A | * | 11/1999 | Meyer et al. | 360/75 |
| 6,084,754 A | | 7/2000 | Smith et al. | 360/135 |
| 6,088,176 A | | 7/2000 | Smith et al. | 360/46 |
| 6,216,242 B1 | * | 4/2001 | Schaenzer | 360/31 |
| 6,262,572 B1 | * | 7/2001 | Franco et al. | 324/212 |
| 2001/0055175 A1 | * | 12/2001 | Tokuyama et al. | 360/69 |

(Continued)

OTHER PUBLICATIONS

U.S. Appl. No. 09/772,654, "Method and Apparatus for Positioning a Transducer Using a Phase Difference in Surface Profile Variations on a Storage Medium", Hal H. Ottesen et al., filed Jan. 29, 2001.

(Continued)

*Primary Examiner*—David Hudspeth
*Assistant Examiner*—Natalia Figueroa
(74) *Attorney, Agent, or Firm*—Chambliss, Bahner & Stophel, P.C.; David W. Lynch

(57) ABSTRACT

A slider having leading and trailing edges is configured to fly on an airbearing above a data storage disk rotating from the leading edge to the trailing edge. Read and write heads are mounted on the slider proximate the trailing edge. An auxiliary thermal sensor is mounted on the slider, but preferably nearer the leading edge. Forward placement of the sensor allows it to sense mechanical defects before they reach the heads, thereby permitting a write inhibit operation, for example. The sensor may also be used to detect airbearing modulation. Appropriate action may be taken when unacceptable airbearing modulation is detected, such as notifying the user and/or scrubbing the slider. The sensor is preferably wider than the heads. This allows, for example, an in-situ glide test to be performed faster using the sensor. An arm electronics module is preferably configured to permit concurrent operation of the sensor and heads.

31 Claims, 10 Drawing Sheets

U.S. PATENT DOCUMENTS

2003/0210486 A1* 11/2003 Ottesen et al. ................ 360/25

OTHER PUBLICATIONS

U.S. Appl. No. 09/811,287, "Method and Apparatus for Estimating the Flyheight of an Airbearing Slider in a Storage Device", James H. Brannon et al., filed Mar. 16, 2001.

U.S. Appl. No. 09/811,015, "Method and Apparatus for Estimating the Flyheight of an Airbearing Slider in a Storage Device Using Variable Spindle Velocity", Hal H. Ottesen et al., filed Mar. 16, 2001.

U.S. Appl. No. 09/772,670, "Storage Disk Having Surface Profile Variations Patterned to Reduce Slider Airbearing Modulation", Hal H. Ottesen et al., filed Jan. 29, 2001.

* cited by examiner

APPARATUS FOR LOOK-AHEAD THERMAL SENSING IN A DATA STORAGE DEVICE

CROSS-REFERENCE TO RELATED APPLICATION

This patent application is related to 10/140,699, filed concurrently, entitled "METHOD FOR LOOK-AHEAD THERMAL SENSING IN A DATA STORAGE DEVICE", which is assigned to the assignee of the instant application.

FIELD OF THE INVENTION

The present invention relates in general to data storage systems. In particular, the present invention relates to apparatus for look-ahead thermal sensing in a data storage device.

BACKGROUND

A typical magnetic data storage system includes a magnetic medium for storing data in magnetic form and a transducer used to write and read magnetic data respectively to and from the medium. A disk storage device, for example, includes one or more data storage disks coaxially mounted on a hub of a spindle motor. The spindle motor rotates the disks at speeds typically on the order of several thousand revolutions-per-minute. Digital information, representing various types of data, is typically written to and read from the data storage disks by one or more transducers, or read/write heads, which are mounted to an actuator assembly and passed over the surface of the rapidly rotating disks.

The actuator assembly typically includes a coil assembly and a plurality of outwardly extending arms having flexible suspensions with one or more transducers and slider bodies being mounted on the suspensions. The suspensions are interleaved within the stack of rotating disks, typically using an arm assembly (E-block) mounted to the actuator assembly. The coil assembly, typically a voice coil motor (VCM), is also mounted to the actuator assembly diametrically opposite the actuator arms. The coil assembly generally interacts with a permanent magnet structure, and is responsive to a transducer positioning controller.

In a typical digital magnetic data storage system, digital data is stored in the form of magnetic transitions on a series of concentric, spaced tracks comprising the surface of the magnetizable rigid data storage disks. The tracks are generally divided into a plurality of sectors, with each sector comprising a number of information fields. One of the information fields is typically designated for storing data, while other fields contain track and sector identification and synchronization information, for example. Data is transferred to, and retrieved from, specified track and sector locations by the transducers which follow a given track and may move from track to track, typically under servo control of a position controller.

The head slider body is typically designed as an aerodynamic lifting body that lifts the transducer off the surface of the disk as the rate of spindle motor rotation increases, and causes the transducer to hover above the disk on an airbearing cushion produced by high speed disk rotation. The separation distance between the transducer and the disk, typically 0.1 microns or less, is commonly referred to as head-to-disk spacing or flyheight. As disk storage devices become more sophisticated, flyheights are becoming smaller and smaller.

Writing data to a data storage disk generally involves passing a current through the write element of the transducer to produce magnetic lines of flux which magnetize a specific location of the disk surface. Reading data from a specified disk location is typically accomplished by a read element of the transducer sensing the magnetic field or flux lines emanating from the magnetized locations of the disk. As the read element passes over the rotating disk surface, the interaction between the read element and the magnetized locations on the disk surface results in the production of electrical signals in the read element. The electrical signals correspond to transitions in the magnetic field emanating from the magnetized locations on the disk.

Conventional data storage systems generally employ a closed-loop servo control system to move the actuator arms to position the read/write transducers to specified storage locations on the data storage disk. During normal data storage system operation, a servo transducer, generally mounted proximate the read/write transducers, or, alternatively, incorporated as the read element of the transducer, is typically employed to read servo information for the purpose of following a specified track (track following) and seeking specified track and data sector locations on the disk (track seeking).

A servo writing procedure is typically implemented to initially prerecord servo pattern information on the surface of one or more of the data storage disks. A servo writer assembly is typically used by manufacturers of data storage systems to facilitate the transfer of servo pattern data to one or more data storage disks during the manufacturing process.

In one known servo technique, embedded servo pattern information is written to the disk along segments extending in a direction generally outward from the center of the disk. The embedded servo pattern is thus formed between the data storing sectors of each track. It is noted that a servo sector typically contains a pattern of data, often termed a servo burst pattern, used to maintain alignment of the read/write transducers over the centerline of a track when reading and writing data to specified data sectors on the track. The servo information may also include sector and track identification codes which are used to identify the position of the transducer. The embedded servo technique offers significantly higher track densities than dedicated servo, in which servo information is taken from one dedicated disk surface, since the embedded servo information is more closely co-located with the targeted data information.

Pre-embossed rigid thermal (PERT) disk technology uses the thermal response of a magnetoresistive (MR) head induced by servo information on a storage medium in order to position the MR head. As described in U.S. Pat. No. 5,739,972, entitled "Method and Apparatus for Positioning a Magnetoresistive Head Using Thermal Response to Servo Information on the Recording Medium", issued Apr. 14, 1998 to Gordon J. Smith et al. and assigned to the assignee of the instant application, a PERT disk includes servo information provided to induce a thermal response in the MR head. The servo information is typically provided in the form of pre-embossed surface profile variations on the disk. A controller controls the relative position between the MR head and the embossed disk track using the thermal response induced in the MR head.

Typically in PERT disk technology, a read signal from an MR head is filtered to separate thermal and magnetic components. As disclosed in U.S. Pat. No. 6,088,176, entitled "Method and Apparatus for Separating Magnetic and Thermal Components from an MR Read Signal", issued Jul. 11, 2000 to Gordon J. Smith et al. and assigned to the assignee of the instant application, the thermal and magnetic components of a MR read signal are separated using a finite impulse response (FIR) filter. The thermal component is the thermal response of the MR head to the surface profile variations on the PERT disk. For the purpose of track following, for example, the surface profile variations may include serrated inner diameter (ID) and outer diameter (OD) track edges, which are radially aligned. For each track, the ID edge serration has a different serration frequency than the OD edge serration. By examining the frequency content of the thermal component of the read signal, the off-track direction and magnitude of the MR head can be determined and an appropriate control signal provided to the actuator to position the MR head over the centerline of a track. This multiple-frequency track serration arrangement provides improved track following without sacrificing data capacity of a disk. Unlike embedded servo techniques, this arrangement does not store servo information in disk space that could otherwise be used for data storage.

Thus, higher areal density can be achieved in varying degrees through the use of technologies such as embedded servo and PERT. However, higher areal density can increase the likelihood of misregistration as each transition is packed closer to adjacent transitions on the surface of the disk. Misregistration occurs when the write head or the read head is not correctly positioned over an intended location on the disk. Misregistration can be caused when the airbearing slider is experiencing unintended motion, for example, due to effects such as vibration, contaminants on the slider's airbearing surface, or contaminants or other topographical defects on the disk's surface. This unintended motion is often referred to as head modulation or airbearing modulaton. Airbearing modulation can cause data loss, for example, when a write head overwrites previously written data at an unintended location on the disk. In such a case, both the overwritten data and the newly written data can be lost. In addition, airbearing modulation can cause data errors, for example, when a head reads data at an unintended location on the disk.

U.S. Pat. No. 5,721,457, entitled "Shock Isolation System with Write Inhibit", issued Feb. 24, 1998 to Sri-Jayantha et al. and assigned to the assignee of the instant application, discloses a computer apparatus that inhibits a write operation based on electrical signals from one or more stress sensors included in shock isolators mounted between an enclosure and a direct access storage device mounted within the enclosure. The stress sensors sense abrupt in-plane motion, e.g., shock or vibration, of the direct access storage device that may cause an airbearing slider within the direct access storage device to experience unintended motion. Unfortunately, the stress senors do not sense other events that can cause unintended airbearing slider motion, such as contaminants on the slider's airbearing surface, or contaminants or other topographical defects on the disk's surface. Moreover, the stress sensors are configured to sense in-plane motion, i.e., motion of the direct access storage device in the plane of the data storage disk, but not normal-to-plane motion, i.e., motion of the direct access storage device along an axis perpendicular to the plane of the data storage disk. Although not sensed by the stress sensors, normal-to-plane motions can also cause unintended motion of the airbearing slider.

In addition, higher areal density can increase the likelihood of data loss if mechanical defects, such as pits, scratches, debris, asperities, lube puddles and dings, are present on the surface of the data storage disk. That is, mechanical defects are more likely to affect transitions written on the surface of the disk as the area of each transition becomes smaller and smaller with increasing areal density. If data is written on a mechanical defect, the read head may not be able to read it successfully. Consequently, it is desirable to detect mechanical defects by performing a glide test of the disk surface during manufacture of the data storage device. Typically, the glide test uses the read head to detect mechanical defects. Disks with mechanical defects are typically replaced. Unfortunately, such glide tests are time consuming (e.g., often exceeding 10 minutes) because the read heads are used to entirely and successively scan the recording surfaces of each disk in the data storage device.

There exists in the data storage system manufacturing industry a need for an enhanced mechanism for addressing the problems associated with airbearing modulation and disk surface mechanical defects. The present invention addresses these and other needs.

SUMMARY OF THE INVENTION

In accordance with a first aspect of the present invention, there is provided a slider assembly having a slider with leading and trailing edges configured to fly on an airbearing above a data storage disk rotating from the leading edge to the trailing edge. Read and write heads are mounted on the slider proximate the trailing edge. An auxiliary thermal sensor is mounted on the slider, but preferably nearer the leading edge. Forward placement of the auxiliary thermal sensor allows it to sense mechanical defects before they reach the heads, thereby permitting a write inhibit operation, for example. The auxiliary thermal sensor may also be used to detect airbearing modulation. Appropriate action may be taken when unacceptable airbearing modulation is detected, such as notifying the user and/or scrubbing the slider. The auxiliary thermal sensor is preferably wider than the heads. This allows, for example, an in-situ glide test to be performed faster using the auxiliary thermal sensor.

In accordance with a second aspect of the present invention, there is provided a data storage device having a data storage disk, a slider, an actuator provided to position the slider relative to the storage disk, and a motor provided to rotate the storage disk relative to the slider. The slider has leading and trailing edges configured to fly on an airbearing above the data storage disk rotating from the leading edge to the trailing edge. Read and write heads are mounted on the slider proximate the trailing edge. An auxiliary thermal sensor is mounted on the slider, but preferably nearer the leading edge. Forward placement of the auxiliary thermal sensor allows it to sense mechanical defects before they reach the heads, thereby permitting a write inhibit operation, for example. The auxiliary thermal sensor may also be used to detect airbearing modulation. Appropriate action may be taken when unacceptable airbearing modulation is detected, such as notifying the user and/or scrubbing the slider. The auxiliary thermal sensor is preferably wider than the heads. This allows, for example, an in-situ glide test to be performed faster using the auxiliary thermal sensor.

In accordance with a third aspect of the present invention, there is provided an arm electronics module having a write driver, a preamplifier and an amplifier. The write driver provides a write current to a write head based on encoded data provided by a recording channel. The preamplifier provides a read signal by maintaining one of a constant current or a constant voltage for a read head and amplifying changes in the other of the current or voltage of the read head as a data storage disk is rotated thereunder. The amplifier provides a thermal sensor output by maintaining one of a constant current or a constant voltage for an auxiliary thermal sensor and amplifying changes in the other of the current or voltage of the auxiliary thermal sensor as changes in flyheight occur between the auxiliary thermal sensor and the data storage disk as the data storage disk is rotated thereunder. Preferably, the arm electronics module is configured to permit concurrent operation of the auxiliary thermal sensor and heads.

In accordance with a fourth aspect of the present invention, there is provided an arm electronics module having driving means for providing a write current to a write head based on encoded data provided by a recording channel, preamplifying means for providing a read signal by maintaining one of a constant current or a constant voltage for a read head and amplifying changes in the other of the current or voltage of the read head as a data storage disk is rotated thereunder, and amplifying means for providing a thermal sensor output by maintaining one of a constant current or a constant voltage for an auxiliary thermal sensor and amplifying changes in the other of the current or voltage of the auxiliary thermal sensor as changes in flyheight occur between the auxiliary thermal sensor and the data storage disk as the data storage disk is rotated thereunder. Preferably, the arm electronics module is configured to permit concurrent operation of the auxiliary thermal sensor and heads.

In accordance with a fifth aspect of the present invention, there is provided a data storage device having a data storage disk, a slider, an actuator provided to position the slider relative to the storage disk, a motor provided to rotate the storage disk relative to the slider, a write driver, a preamplifier and an amplifier. The slider has leading and trailing edges configured to fly on an airbearing above the data storage disk rotating from the leading edge to the trailing edge. Read and write heads are mounted on the slider proximate the trailing edge. An auxiliary thermal sensor is mounted on the slider, but preferably nearer the leading edge. The write driver provides a write current to the write head based on encoded data provided by a recording channel. The preamplifier provides the read signal by maintaining one of a constant current or a constant voltage for a read head and amplifying changes in the other of the current or voltage of the read head as a data storage disk is rotated thereunder. The amplifier provides a thermal sensor output by maintaining one of a constant current or a constant voltage for the auxiliary thermal sensor and amplifying changes in the other of the current or voltage of the auxiliary thermal sensor as changes in flyheight occur between the auxiliary thermal sensor and the data storage disk as the data storage disk is rotated thereunder. The write driver, preamplifier and amplifier are preferably configured to permit concurrent operation of the auxiliary thermal sensor and heads.

DETAILED DESCRIPTION OF THE PREFERRED EMBODIMENTS

Figure 1:
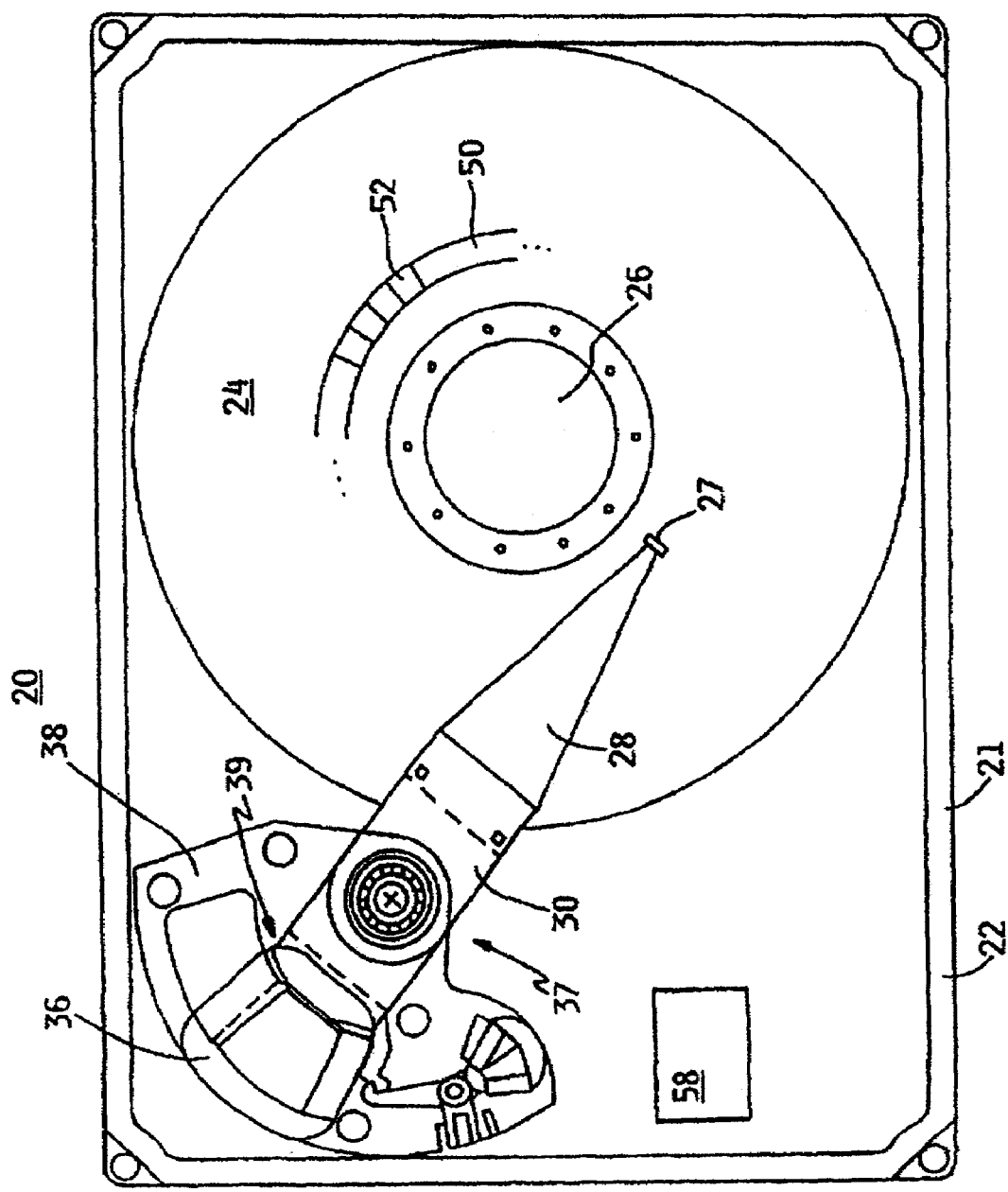
FIG. 1 is a top view of a data storage system with its upper housing cover removed.

The present invention addresses the problem of detecting slider dynamics and disk defects by using an auxiliary thermal sensor attached to an airbearing slider in a disk drive. More specifically, the present invention uses a auxiliary thermal sensor that is similar to conventional magnetoresistive (MR) and giant magnetoresistance (GMR) heads, but is located some distance away from the usual placement of these heads. The auxiliary thermal sensor is preferably located forward (i.e., toward the leading edge) of the slider airbearing. In addition, the width of the auxiliary thermal sensor is preferably much greater, in a track width direction, than that of conventional MR and GMR heads. Furthermore, the sensitivity of the auxiliary thermal sensor to changes in the slider-to-disk spacing can be made many times that of conventional MR and GMR heads. Also, the auxiliary thermal sensor is preferably constructed so that the magnetic fields emanating from it are minimized so as not to interfere with the recorded data on a disk surface.

There are several significant advantages of the present invention. First, owing to the wider sensing width and forward placement on the slider airbearing, the auxiliary thermal sensor senses mechanical defects (i.e., defects having a topography) on the surface of the disk before the defects reach the location of the read and write heads. This look-ahead arrangement allows a write inhibit operation, for example. By not writing when a defect is sensed, i.e., a write inhibit operation, benefits of a write-verify operation may be obtained without the performance penalty of additional disk revolutions. Typical defects include pits, scratches, debris, asperities, lube puddles, and dings. The larger width of the auxiliary thermal sensor accounts for the different head skews at various disk radii.

A second advantage of the present invention is that head modulation can be detected even while a head is writing data to the disk, for example. This is a very significant advantage and a huge improvement over all present methods. Present methods that either attempted or proposed to detect bad writes, sense airbearing modulation using a conventional MR or GMR head. Unfortunately, such methods are of no use while writing with the conventional arm electronics in use today, which do not permit concurrent read and write operations. Conventional arm electronics allow only a read or a write, but not both at the same time. With the present invention, writing can stop the instant that head modulation is detected.

A third advantage of the present invention is that the wider auxiliary thermal sensor allows for improved in-situ glide testing both in manufacturing and in the field. With the larger width of the auxiliary thermal sensor (as compared to a conventional MR or GMR head used for reading data from the disk surface), the pitch of a spiral typically used for glide testing can be increased (as compared to the pitch necessary when the conventional MR or GMR head is also used for glide testing) to minimize the number of disk revolutions, and therefore the time, required for the glide test.

Figure 2:
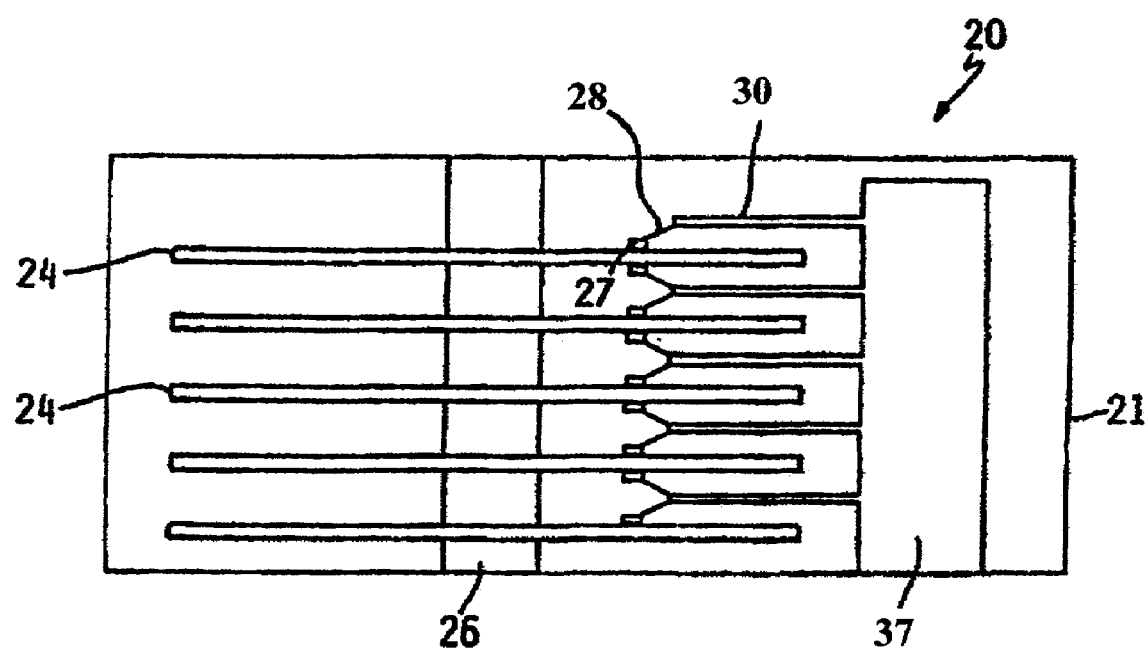
FIG. 2 is a side plan view of a data storage system comprising a plurality of data storage disks.

Referring now to the drawings, and more particularly to FIG. 1, there is shown a magnetic data storage system 20 with its cover (not shown) removed from the base 22 of the housing 21. As best seen in FIG. 2, the magnetic data storage system 20 typically includes one or more rigid data storage disks 24 which rotate about a spindle motor 26. The rigid data storage disks 24 are typically constructed with a metal, ceramic, glass, or plastic substrate upon which a recording layer is formed. In one typical construction, a magnetizable recording layer is formed on an aluminum, glass or ceramic substrate. In another typical construction, an aluminum optical recording layer is formed on a plastic substrate.

Referring back to FIG. 1, an actuator assembly 37 typically includes a plurality of interleaved actuator arms 30, with each arm having one or more suspensions 28 and airbearing sliders 27. Each airbearing slider 27 has mounted thereon one or more transducers (not shown) and auxiliary thermal sensors (not shown). The transducers typically include components both for reading and writing information to and from the data storage disks 24. Each transducer may include, for example, an MR or GMR read head and an inductive write head. Alternatively, each transducer may include an inductive head having a combined read/write element or separate read and write elements, or an optical head having separate or combined read and write elements. The actuator assembly 37 includes a coil assembly 36 which cooperates with a permanent magnet structure 38 to operate as an actuator voice coil motor (VCM) 39 responsive to control signals produced by controller 58. The controller 58 preferably includes control circuitry that coordinates the transfer of data to and from the data storage disks 24, and cooperates with the VCM 39 to move the actuator arms 30 and suspensions 28, to position the transducers to prescribed track 50 and sector 52 locations when reading and writing data from and to the disks 24.

The auxiliary thermal sensor is essentially an MR or GMR head that is optimized for sensing head-to-disk spacing. It is known that the thermal response of an MR head changes as a function of the spacing between the MR head and the disk surface. See, for example, U.S. Pat. No. 5,739,972, entitled "Method and Apparatus for Positioning a Magnetoresistive Head Using Thermal Response to Servo Information on the Recording Medium", issued Apr. 14, 1998 to Gordon J. Smith et al. and assigned to the assignee of the instant application. In an MR head, an electrical current is passed through an MR stripe causing its temperature to rise due to Joule heating. The elevated temperature of the MR stripe causes heat to be transferred to the cooler airstream beneath the slider. Changes in vertical spacing between the MR head and the disk (i.e., the flying height) change the amount of heat flux to the air and therefore directly affect the MR stripe's temperature. The materials in the MR stripe typically have a positive temperature coefficient of resistance. Therefore, changes in the temperature of the MR stripe can be detected via changes in the voltage drop across the MR stipe.

Figure 3:
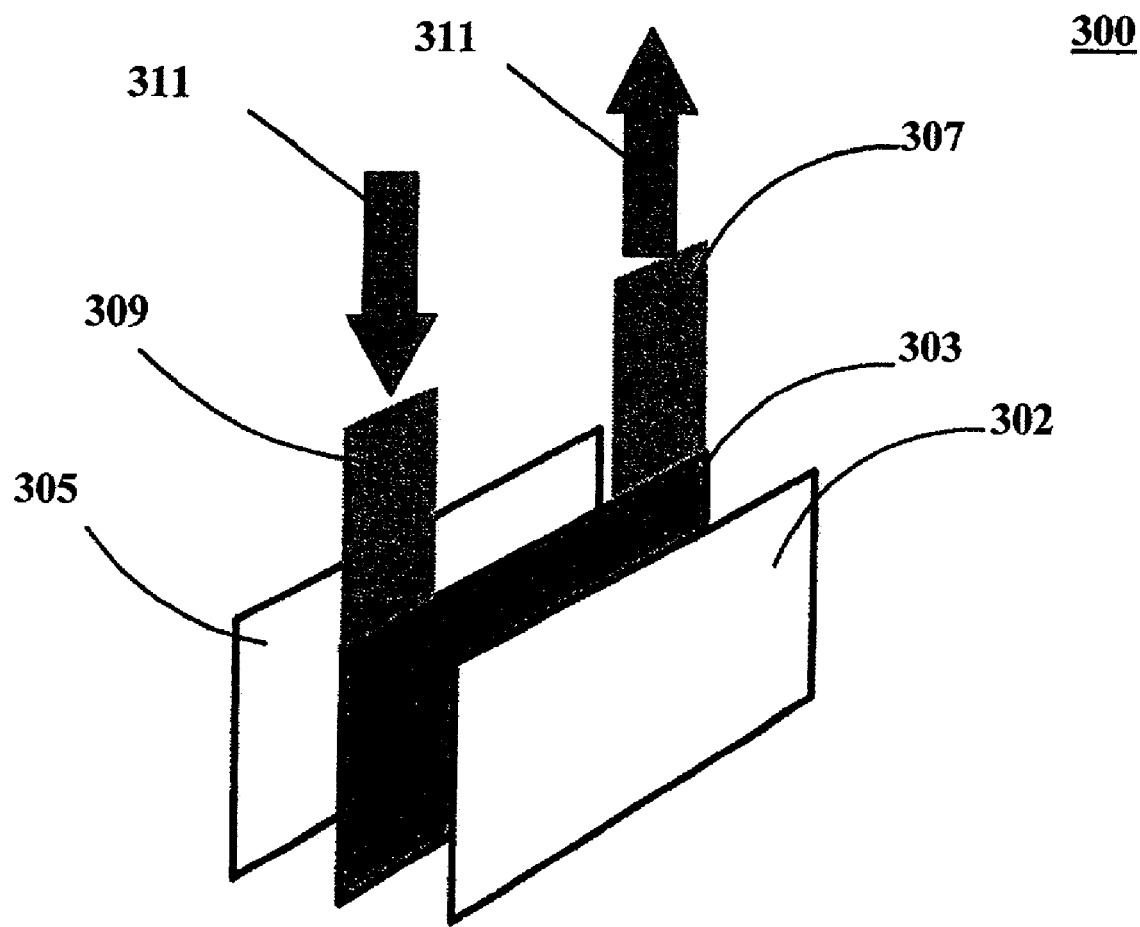
FIG. 3 is a perspective view of an auxiliary thermal sensor according to an embodiment of the present invention.

FIG. 3 is a perspective view of an auxiliary thermal sensor according to a first embodiment of the present invention. In the embodiment illustrated in FIG. 3, auxiliary thermal sensor 300 includes both an MR material, referred to herein as MR stripe 303, and adjacent shields 302 and 305. In alternative embodiments of the present invention, however, at least one of the adjacent shields may be omitted and/or a GMR material may be used in lieu of the MR material. The MR stripe 303 is preferably positioned between shield 302 and shield 305. The shields 302 and 305 are preferably made of permalloy and limit the magnetic fields sensed by MR stripe 303. In addition, shields 302 and 305 limit the magnetic fields emanating from auxiliary thermal sensor 300 so that it does not to interfere with the recorded data on a disk surface (not shown). Attached to MR stripe 303 are two electrically conductive leads 307 and 309. An electrical current 311 is passed through MR stripe 303. The current 311 causes MR stripe 303 to rise in temperature due to Joule heating.

From a heat transfer standpoint, the temperature of MR stripe 303 is controlled by the amount of heat transferred to shields 302 and 305 and to the air between auxiliary thermal sensor 300 and the disk surface. Of primary interest is the heat transferred to the disk via the airstream. The air is rarefied since the physical spacing between auxiliary thermal sensor 300 and the disk is on the order of a mean free path of air molecules. Important heat transfer mechanisms for this situation are radiative heat transfer and ballistic heat transfer. Radiative heat transfer is essentially electromagnetic, while ballistic heat transfer involves the transfer of energy through colliding molecules. An ideal thermal sensor would transfer heat energy to only the disk and not the shields or leads. In this way, only changes in flying height of the slider (not shown, but to which the thermal sensor is attached) would be sensed. In practice, however, typically only about 10 to 30 percent of the heat energy transferred from the auxiliary thermal sensor goes to the disk.

The temperature coefficient of resistance α is an important design parameter for the auxiliary thermal sensor. For metals (including MR and GMR materials) the resistance typically increases with temperature, i.e., α is positive. This is a consequence of the higher kinetic energy of atoms in the metal which impedes the flow of electrons through it. The resistance R at a temperature T can be expressed as a function of the temperature coefficient of resistance α, an initial resistance $R_0$, and an initial temperature $T_0$ as given by Equation 1.

$$R = R_0 + R_0 \alpha (T - T_0) \qquad \text{Equation (1)}$$

Equation 1 shows that the resistance R at some temperature T clearly depends on the initial value of resistance plus a fraction of the initial value times the change in temperature. Equation 1 is linear and holds true for modest temperature changes of less than about 200° C. For an auxiliary thermal sensor mounted on a slider, the temperature changes are expected to be much less than 100° C. Nearly any metal is suitable for use as the stripe material of the auxiliary thermal sensor. Suitable metals include permalloy, platinum and nickel, for example. Some metals have larger α's than others. For example, permalloy has an $\alpha=3\times10^{-3}$ and is typically used as the stripe material in MR heads. Platinum, a material used extensively in resistance temperature detectors (RTDs), has an $\alpha=4\times10^{-3}$. Nickel, in its pure form, has an $\alpha=6\times10^{-3}$. For semiconductors, $\alpha$ is typically negative. The stripe material used in the auxiliary thermal sensor could have a positive or negative $\alpha$. Thus, a semiconductor or other material having a negative $\alpha$ may be used as the stripe material in lieu a material having a positive $\alpha$ such as a metal. Furthermore, it is not necessary that the resistance of the stripe material change linearly with temperature. For example, if the resistance changes with temperature in an exponential manner, which is typical for semiconductor-based sensors, the relationship can be handled by using a lookup table or a logarithmic amplifier.

The auxiliary thermal sensor changes its resistance depending on the spacing between it and the disk surface. It has been determined by extensive experimentation using MR heads that resistance change is nearly linear with head-to-disk spacing. That is, as spacing increases, the MR resistance increases (owing to the higher temperature of the MR stripe, which is a consequence of the thicker air film between the MR head and the disk). An equation that expresses the sensitivity of the voltage drop across the MR stripe to spacing change when the auxiliary thermal sensor is operated at constant current is given by Equation 2.

$$dV/dh=(\alpha/k)R^2I^3 \qquad \text{Equation (2)}$$

Equation 2 is easily derived from first principles. In Equation 2, k is the thermal conductivity of air. The equation clearly shows the advantage of using auxiliary thermal sensors with a larger resistances R operating at high currents I. For example, an auxiliary thermal sensor with $\alpha=3\times10^{-3}$, R=50 ohms, I=6×10$^{-3}$ amperes, and k=26×10$^6$ W/m*K results in dV/dh=62 microvolts/nanometer.

The output voltage of the auxiliary thermal sensor will therefore change linearly with spacing as shown in Equation 2. If the auxiliary thermal sensor passes over a pit, scratch, or other depression in the disk surface, the voltage drop across the sensor will increase. On the other hand, if the auxiliary thermal sensor comes into close proximity with the disk surface, perhaps passing over an asperity, the voltage drop across the sensor will decrease. If the airbearing begins modulating in flyheight at some characteristic frequency, this frequency will be found in the voltage signal. The voltage drop across the auxiliary thermal sensor for various defects is shown in FIG. 4B.

In the embodiment described above, the auxiliary thermal sensor is operated at a constant current. It should be appreciated, however, that in an alternative embodiment, the auxiliary thermal sensor may be operated at a constant voltage rather than at a constant current. In this alternative embodiment, the current through of the auxiliary thermal sensor would change as a function of sensor-to-disk spacing.

Figure 4:
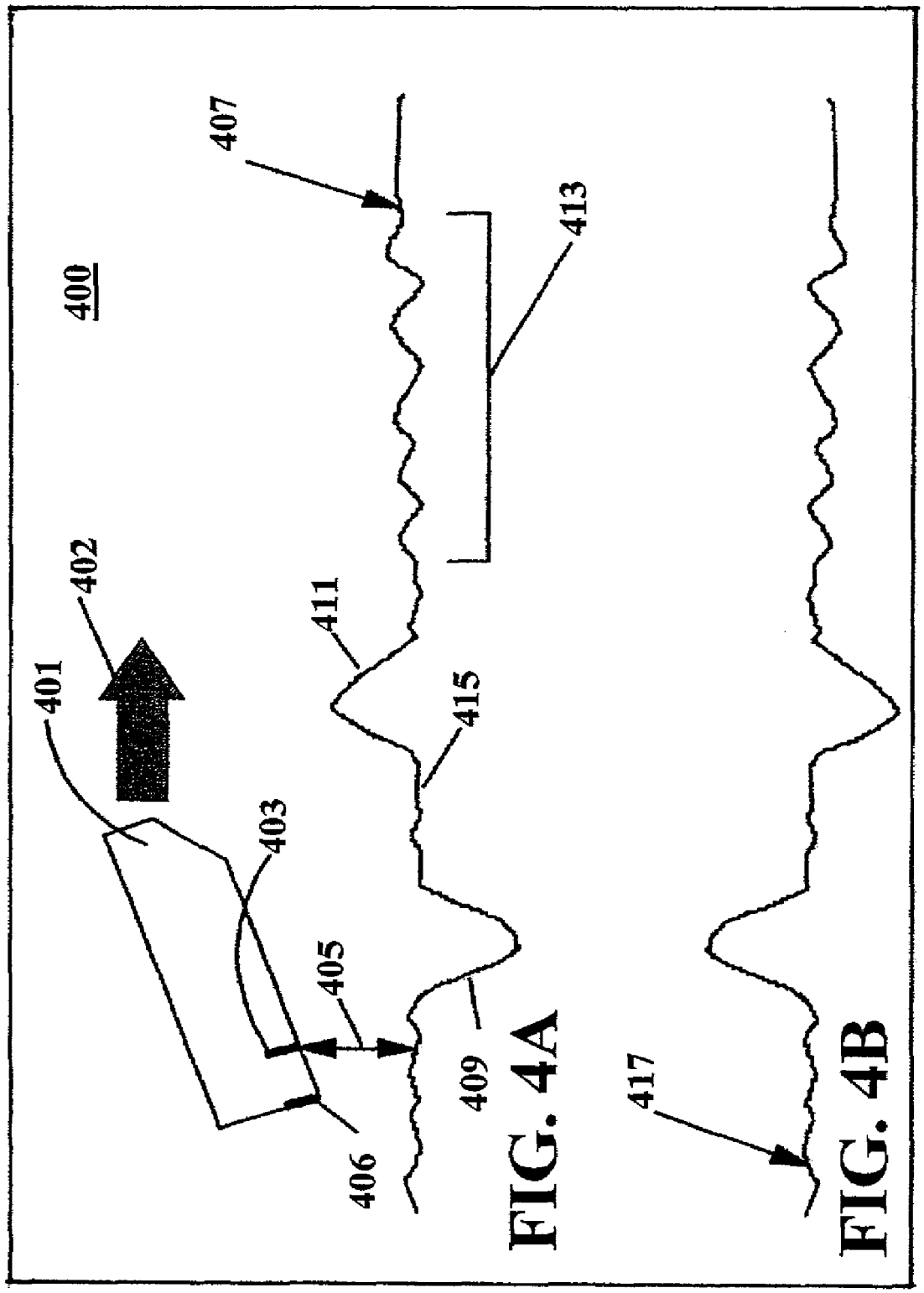
FIG. 4A is an exaggerated side view showing a data storage disk exhibiting various surface defects.
FIG. 4B is a thermal response of an auxiliary thermal sensor to such defects according to an embodiment of the present invention. The auxiliary thermal sensor is mounted on an airbearing slider flying above the disk.

FIG. 4A is an exaggerated side view showing a data storage disk exhibiting various surface defects, and FIG. 4B is a thermal response (i.e., the signal voltage in this embodiment) of an auxiliary thermal sensor to such defects. In FIG. 4A, a slider 401 is shown flying above disk surface 407 in a relative direction with respect to the disk surface denoted by arrow 402. The slider 401 has a transducer 406 (preferably, an MR read head and an inductive write head). An auxiliary thermal sensor 403 is located forward of transducer 406. The vertical distance between the thermal sensor 403 and the surface of the disk 407 is denoted by spacing 405. FIG. 4A shows in an exaggerated fashion various defects on disk surface 407, i.e., a pit 409, a bump 411, an area of disk corrugation 413, and a magnetic void 415. The signal voltage 417 from auxiliary thermal sensor 403 is shown in FIG. 4B. As the sensor-to-disk spacing 405 decreases, as with bump 411, the corresponding voltage signal 417 decreases. Similarly, for pit 409, the sensor-to-disk spacing increases and the voltage signal 417 increases. The intent of showing disk corrugation 413 is to point out that if a slider is modulation in flying height due to either a periodic disturbance on the disk surface or if the slider is simply flying in an unstable manner, the voltage signal 417 will follow the sensor-to-disk spacing 405 accurately. For magnetic void 415, which is a portion of the disk surface void of magnetic material, the voltage signal 417 remains unchanged. Magnetic voids typically do not have height or depth, and therefore do not change the voltage signal.

A magnetic coating is not required on the disk surface for the auxiliary thermal sensor to sense sensor-to-disk spacing. This is an important advantage over magnetic spacing measurement techniques such as harmonic ratio flyheight (HRF) and clearance modulation detection (CMD). In contrast to HRF, CMD, and other techniques that analyze the magnetic signal to determine spacing, thermal spacing measurement techniques can be performed on a blank (i.e., uncoated) disk substrate. The present invention allows glide testing of disk substrates in the factory, something that is impossible with HRF, CMD or the like.

Figure 5:
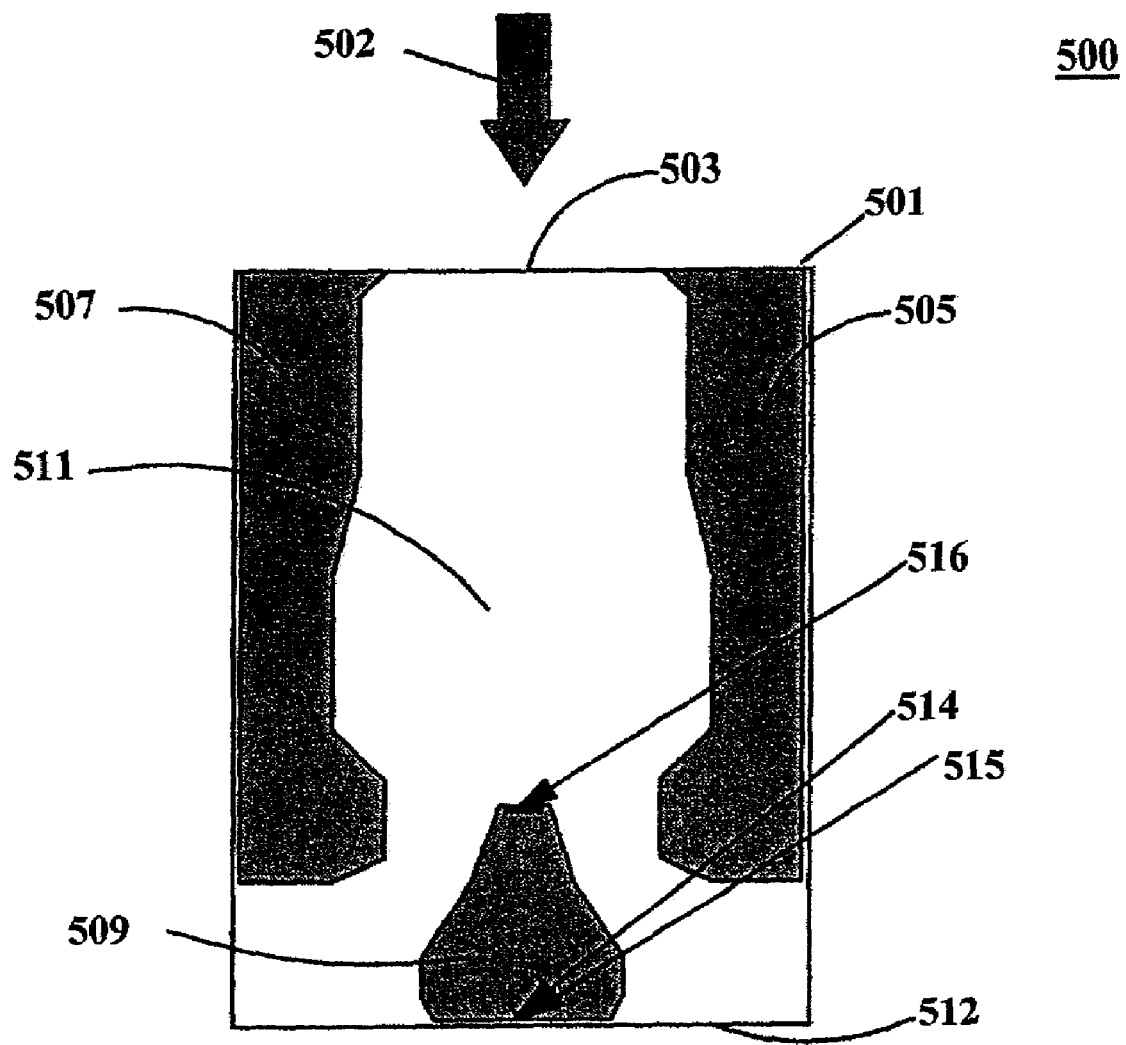
FIG. 5 is a bottom view of an airbearing slider having mounted thereon read and write heads and an auxiliary thermal sensor according to an embodiment of the present invention.

FIG. 5 is a bottom view of a slider assembly 500 according to an embodiment of the present invention. An airbearing slider 501 has mounted thereon an MR head 514 for reading data, an inductive head 515 for writing data, and an auxiliary thermal sensor 516. Airflow relative to slider 501 is denoted by arrow 502. The airflow 502 enters a leading edge 503 of the slider 501. As is conventional, airbearing side rails 505 and 507 provide lateral stability for the slider 501 during operation. As is also conventional, a negative pressure region is formed by an etched cavity 511 between side rails 505 and 507. As is also conventional, a rear bearing pad 509 is located near a trailing edge 512 of slider 501. The MR head 514 and inductive head 515 are conventionally located on rear bearing pad 509 near trailing edge 512 of slider 501. The auxiliary thermal sensor 516 is also located on rear bearing pad 509, but substantially forward of MR head 514 and inductive head 515 (i.e., nearer leading edge 503 of slider 501).

The minimum width of the auxiliary thermal sensor is a function of the read head width (e.g., the width of the stripe of an MR head), head skew angles, and the longitudinal distance between the read head and the auxiliary thermal sensor. Skew angles are important as they define the trajectory that a disk defect will take beneath the rear air bearing pad. A simple geometry is shown in FIG. 6.

Figure 6:
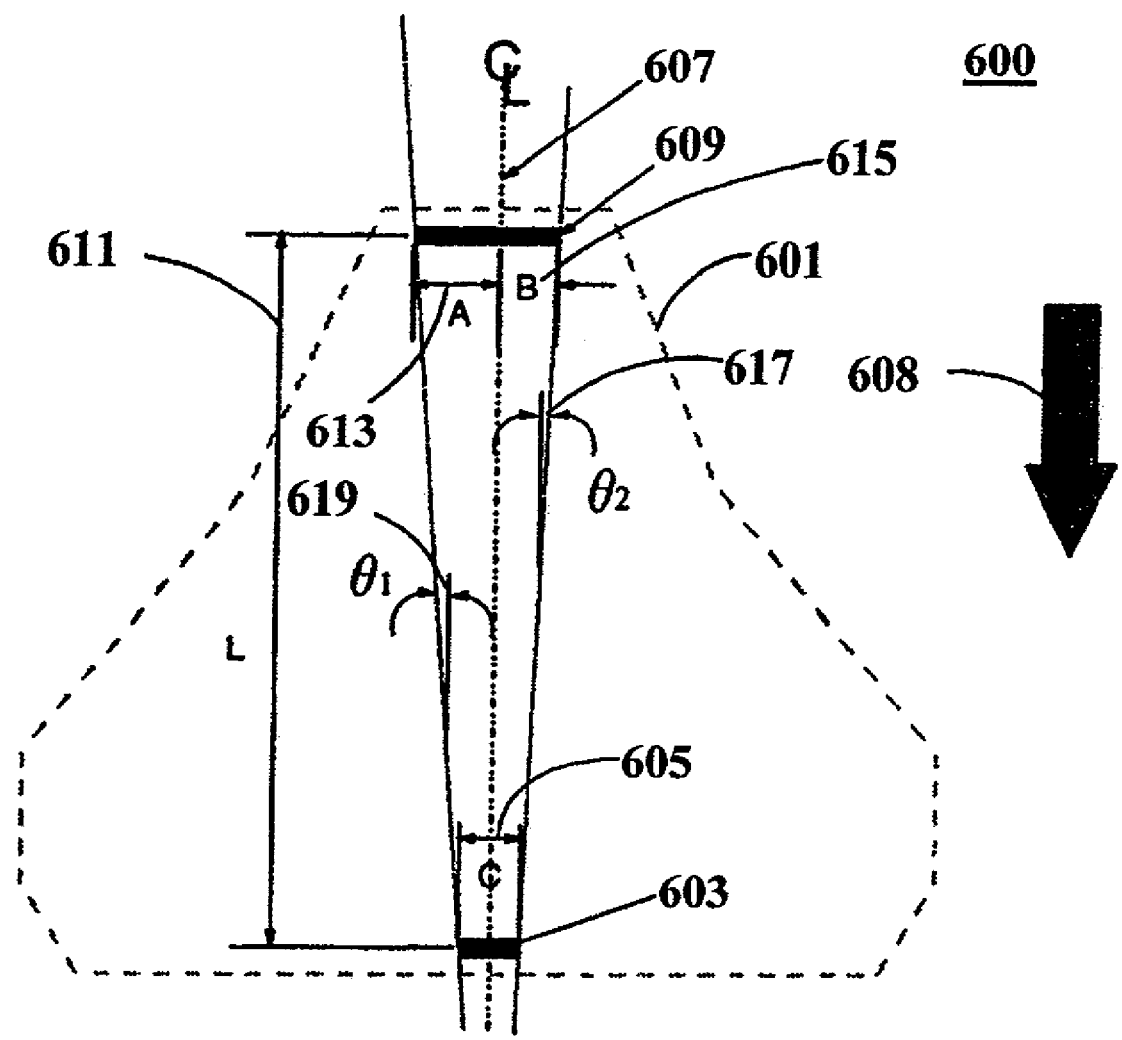
FIG. 6 is a detailed bottom view of a rear airbearing pad of an airbearing slider having mounted thereon read and write heads and an auxiliary thermal sensor according to an embodiment of the present invention.

FIG. 6 is a detailed bottom view of a rear airbearing pad 601 of a slider 600 having mounted thereon an MR read head 603 and an auxiliary thermal sensor 609 according to an embodiment of the present invention. A write head, which is typically mounted on the slider immediately behind the MR head, is not shown for the sake of clarity. The stripe of MR head 603 has a lateral width C (also denoted by reference numeral 605). A centerline 607 passes through the geometric center of MR head 603. The auxiliary thermal sensor 609 lies forward of MR head 603 a distance L (also denoted by reference numeral 611). A disk velocity vector, which is shown by arrow 608, lies in the direction from auxiliary thermal sensor 609 to MR head 603. With respect to centerline 607, the auxiliary thermal sensor 609 has a total width A+B (respectively denoted by reference numerals 613 and 615). Thus, the total width of auxiliary thermal sensor 609 is A+B. More precisely, this is the total width of the stripe of auxiliary thermal sensor 609. The skew angle $\theta_1$ (also denoted by reference numeral 619) and skew angle $\theta_2$ (also denoted by reference numeral 617) define the angle between centerline 607 and slider skew angles corresponding to the inner and outer disk radii. From the geometry shown in FIG. 6, the minimum values for distances A and B are given by Equations 3 and 4. The inequality is used in Equations 3 and 4 because it may be desirable to make the width of auxiliary thermal sensor 609 at least slightly wider to account for a potential loss of thermal sensitivity at the extreme ends of auxiliary thermal sensor 609. Preferably, the width of the auxiliary thermal sensor is about 10% greater than the minimum width. It should be understood, however, that in certain situations (e.g., if less coverage is acceptable) it may be desirable for the width of the auxiliary thermal sensor to be less than the minimum width. Also, the minimum width of the auxiliary thermal sensor may be divided into a number of segments, e.g., five or six, each segment providing a separate output signal. The segments may correspond to the different trajectories that disk defects will take beneath the rear airbearing pad when the read or write head is positioned at different disk radii. For example, segment one may be used when the head is positioned within an inner disk radii band, segments two through five may be used when the head is positioned within four intermediate disk radii bands, and segment six may be used when the head is positioned within an outer disk radii band. In this case, the segments may be normally operated in series to provide a single output signal, but when a disk defect is sensed, for example, only the output signal from the appropriate segment may be used, i.e., the segment that corresponds to the disk radii at which the head is positioned. This may be desirable to avoid sensing a disk defect moving in a trajectory that underlies the auxiliary thermal sensor, but that clears the head. Of course, the result of using a single segment is less conservative than using all of the segments in series.

$$A \geq L \tan \theta_1 + C/2 \quad \text{Equation (3)}$$

$$B \geq L \tan \theta_2 + C/2 \quad \text{Equation (4)}$$

The minimum width for the auxiliary sensor 609 is given by Equation 5.

$$A + B \geq L(\tan \theta_1 + \tan \theta_2) + C \quad \text{Equation (5)}$$

As an example, let $C = 3 \times 10^{-6}$ meters, $L = 250 \times 10^{-6}$ meters, $\theta_1 = 10$ degrees, $\theta_2 = 17$ degrees. From Equations 3 through 5, $A \geq 46 \times 10^{-6}$ meters, $B \geq 80 \times 10^{-6}$ meters, and $A + B \geq 126 \times 10^{-6}$ meters. With a 10% increase for loss of sensitivity at the ends of auxiliary thermal sensor 409, the sensor stripe width should be at least $139 \times 10^{-6}$ meters.

Although the auxiliary thermal sensor is shown in FIG. 6 on the rear airbearing pad along with the usual read and write heads, the auxiliary thermal sensor could be placed further forward on the slider depending on the slider design. For example, the auxiliary thermal sensor could be placed at the leading edge (503 in FIG. 5) of the slider and flush with an airbearing surface at that location. There could also be multiple auxiliary thermal sensors located at various points on the slider. For example, multiple auxiliary thermal sensors could be placed on the side rails (505 and 507 in FIG. 5) for the purpose of detecting roll motion of the slider.

Figure 7:
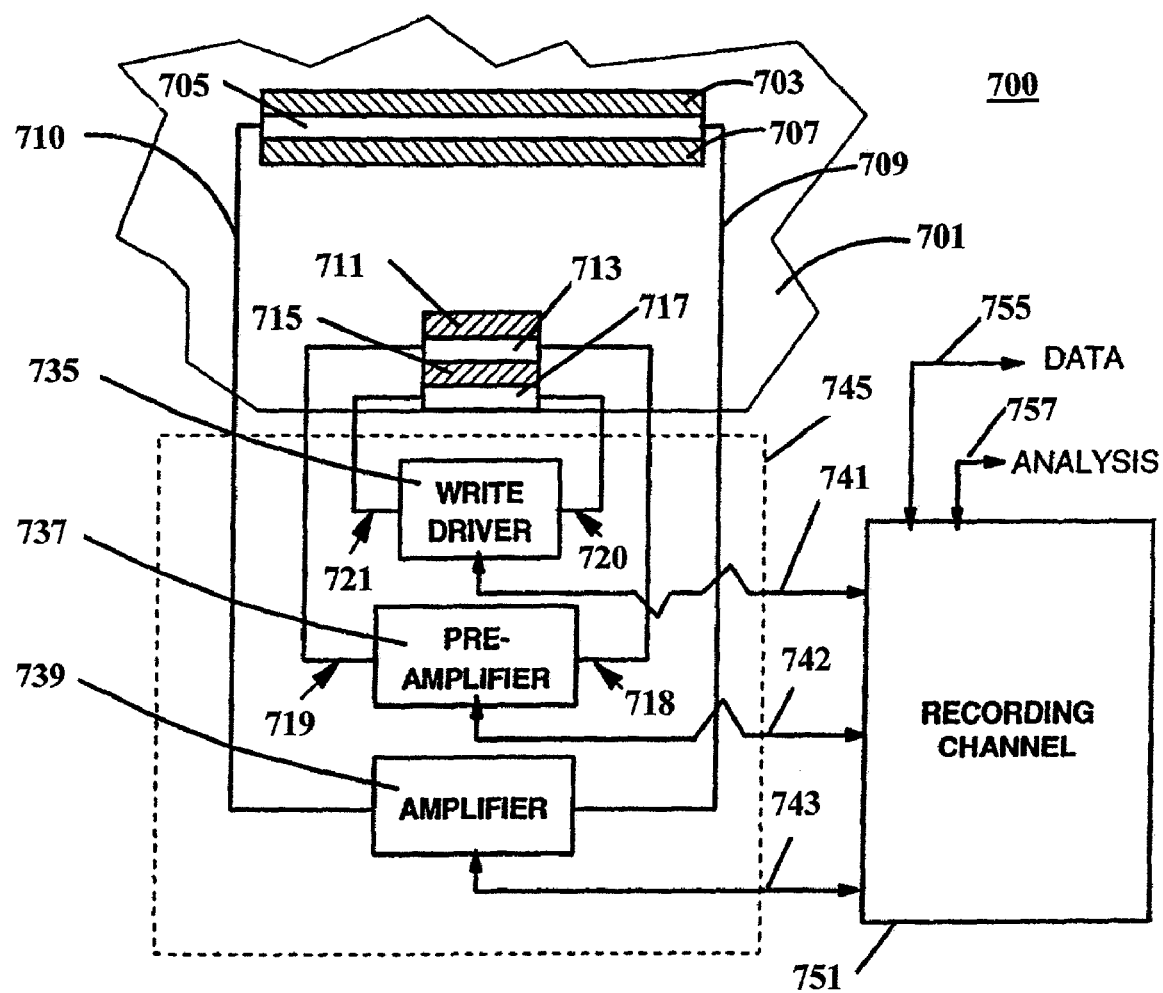
FIG. 7 is a block diagram of an electronic system that interfaces with read and write heads and an auxiliary thermal sensor according to an embodiment of the present invention.

FIG. 7 is a block diagram of an electronic system that interfaces with read and write heads and an auxiliary thermal sensor according to an embodiment of the present invention. Attached to a rear airbearing pad 701 of a slider is an auxiliary thermal sensor that includes a first shield 703, a thermal sensing element 705 (e.g., sensor stripe), and a second shield 707. The shields 703 and 707 act to both electrically and thermally insulate thermal sensing element 705 from the airbearing pad material, which may be electrically conductive. In addition, shields 703 and 707 shunt any magnetic field produced by the current through thermal sensing element 705. Also attached to the rear airbearing pad are a first shield 711, an MR read head 713, a second shield 715, and an inductive write head 717. The MR head 713 is sandwiched between shields 711 and 715. Shields 711 and 715 act to isolate MR head 713 from magnetic fields emanating from magnetically recorded bits on the disk surface that are not immediately under MR head 713.

The thermal sensing element 705 is electrically connected to an amplifier 739 by leads and/or wires 709 and 710. The amplifier 739 maintains thermal sensing element 705 with either a constant current or a constant voltage and amplifies changes in either the voltage or current, respectively. The MR head 713 is electrically connected to a preamplifier 737 by leads and/or wires 718 and 719. The preamplifier 737 maintains either a constant current or a constant voltage for MR head 713 and amplifies changes in either the voltage or current, respectively. The inductive write head 717 is electrically connected to a write driver 735 by leads and/or wires 720 and 721. The write driver 735 supplies a bidirectional current to inductive write head 717 for the purpose of producing a magnetic field in excess of the coercivity of the disk recording medium, thereby recording data in the form of magnetic transitions.

The write driver 735, preamplifier 737 and amplifier 739 reside in an arm electronics module 745 and respectively interface to a recording channel 751 through lines 741, 742 and 743. Hence, arm electronics module 745 is configured to permit concurrent operation of the auxiliary thermal sensor and the heads. The recording channel 751 decodes data read from the disk and encodes data that is to be written to the disk. Data are passed to and from recording channel 751 over data line 755 (e.g., data may be passed to and from a disk drive controller or a host computer over data line 755). The recording channel 751 also performs an analysis based on the output of the auxiliary thermal sensor, which analysis is communicated over analysis line 757 (e.g., the results of the analysis may be passed to a disk drive controller or a host computer over analysis line 757).

The recording channel 751 typically includes an envelope detector (not shown). The envelope detector preferably comprises a thermal separator, which acts as a sophisticated lowpass filter that extracts and provides a thermal output signal. As is well known in the art, the thermal component of an MR-readback signal, may be extracted using conventional techniques. Such conventional techniques may be found in, for example, U.S. Pat. No. 6,088,176, entitled "Method and Apparatus for Separating Magnetic and Thermal Components from an MR Read Signal", issued Jul. 11, 2000 to Gordon J. Smith et al. and assigned to the assignee of the instant application.

In one such conventional thermal signal extraction technique, the sampled readback signal is provided to a first filter, e.g., an inverse infinite impulse response (IIR) filter, to compensate for the high pass filter in the AE module. The output of the first filter is passed through a second filter, e.g., a moving average low-pass finite impulse response (FIR) filter, to recover the thermal component of the sampled readback signal. Typically the FIR filter averages over several samples to provide a moving average.

Thus, in this conventional thermal signal extraction technique, the thermal separator includes an inverse IIR filter and a FIR filter. Of course, other techniques of extracting the thermal component may be used within the scope of the invention. That is, the present invention is neither limited to this particular conventional technique for extracting a thermal component nor the details thereof.

The recording channel 751 also preferably includes a memory (not shown) that stores a historic thermal output of the auxiliary thermal sensor that was previously (e.g., when the storage device was manufactured or at some subsequent point in time) produced for each slider. Alternatively, or in addition, the recording channel 751 may store at least one threshold limit value (e.g., a high threshold value and a low threshold value). In addition, recording channel 751 also preferably includes a comparator (not shown) that compares a present thermal output of the auxiliary thermal sensor to the historic output and/or the threshold limit value(s). If the present thermal output of the auxiliary thermal sensor is outside the threshold limit value(s) and/or has changed by a predetermined amount from the historic thermal output, then the slider is encountering a disk defect or airbearing modulation and appropriate action (e.g., scrubbing the slider to attempt debris removal and/or notification of the user to replace the disk drive) may be taken.

With the availability of an auxiliary thermal sensor located ahead of the conventional read and write heads, may useful features that improve the reliability of a disk drive can be realized. For example, because the auxiliary thermal sensor is located remote from the inductive write head, the auxiliary thermal sensor output is not affected by the writing process. It is therefore possible to monitor for disk defects and slider airbearing modulation while writing data. This has not heretofore been possible.

Figure 8:
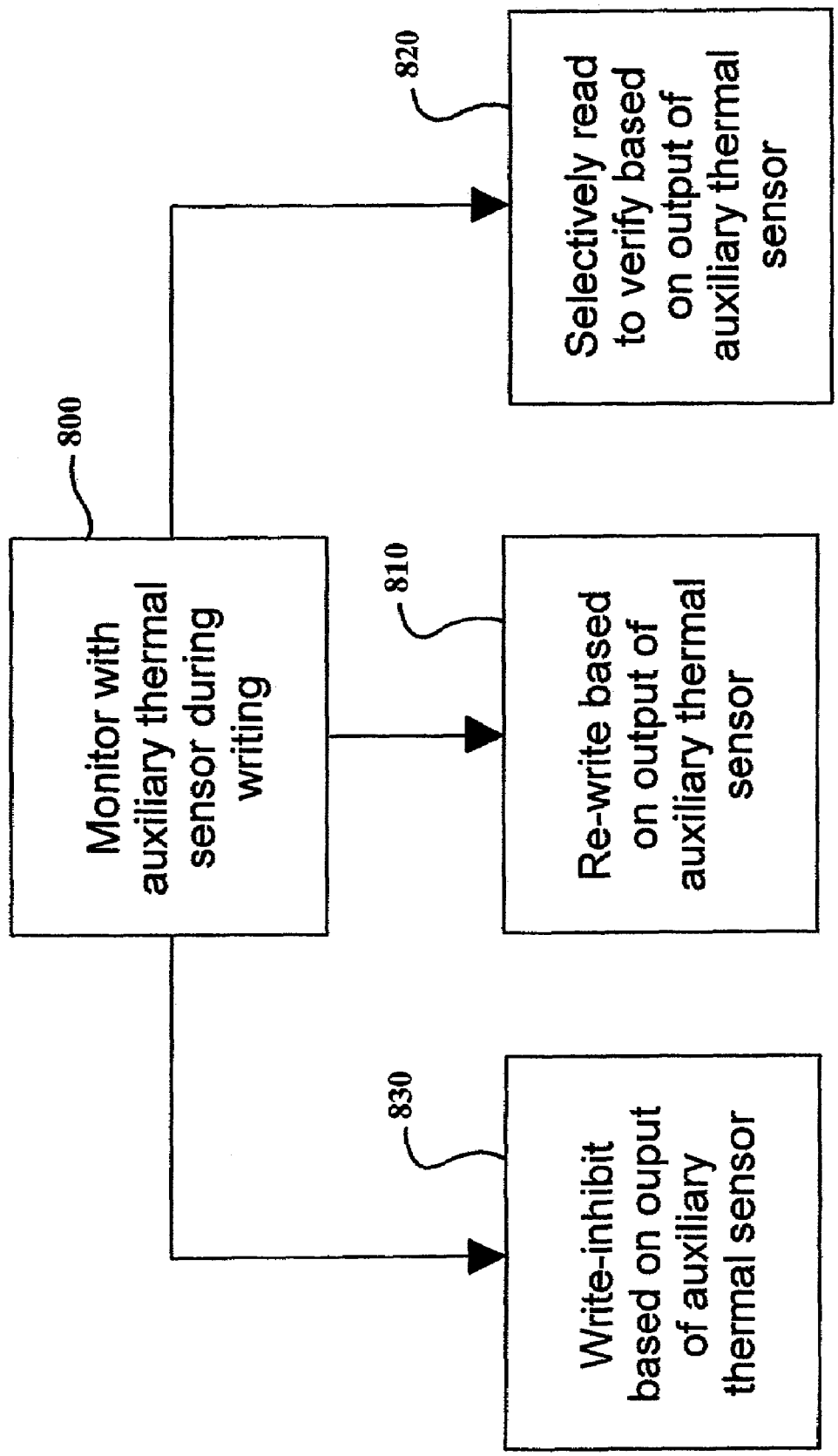
FIG. 8 is a flow diagram illustrating alternative methods of responding to disk defects and slider airbearing modulation detected using an auxiliary thermal sensor during writing according to various embodiments of the present invention.

FIG. 8 is a flow diagram illustrating alternative methods of responding to disk defects and slider airbearing modulation detected using an auxiliary thermal sensor during writing. The ability to monitor flying height while writing has enormous implications. It essentially provides most of the benefits of a write-verify operation without requiring extra disk revolutions and therefore extra time. In a conventional write-verify operation, data is written and then after at least one subsequent disk revolution the written data is read to ensure that it was written correctly. Slider airbearing modulation and disk defects are likely causes of bad writes that fail to verify. If the verify fails, data must be re-written and then verified again. If all data has to be verified, the impact on disk drive performance is huge. The present invention makes it possible to detect disk defects (at least those having height or depth) and slider airbearing modulation while writing. Accordingly, the output of the auxiliary thermal sensor is monitored to detect disk defects and slider airbearing modulation while writing, as denoted in block 800. Only those sectors of data where the output of the auxiliary thermal sensor indicated a problem while writing need to be re-written, as denoted in block 810. Alternatively, a selective write-verify operation can be used wherein only sectors of data where the auxiliary thermal sensor indicated a problem need to be re-read to verify that those sectors were written correctly, as denoted in block 820. As another alternative, the write operation may be immediately stopped (i.e., a write-inhibit step) when the output of the auxiliary thermal sensor indicates a problem while writing, as denoted in block 830. This write-inhibit step (block 830) may also precede the re-write step (block 810).

Figure 9:
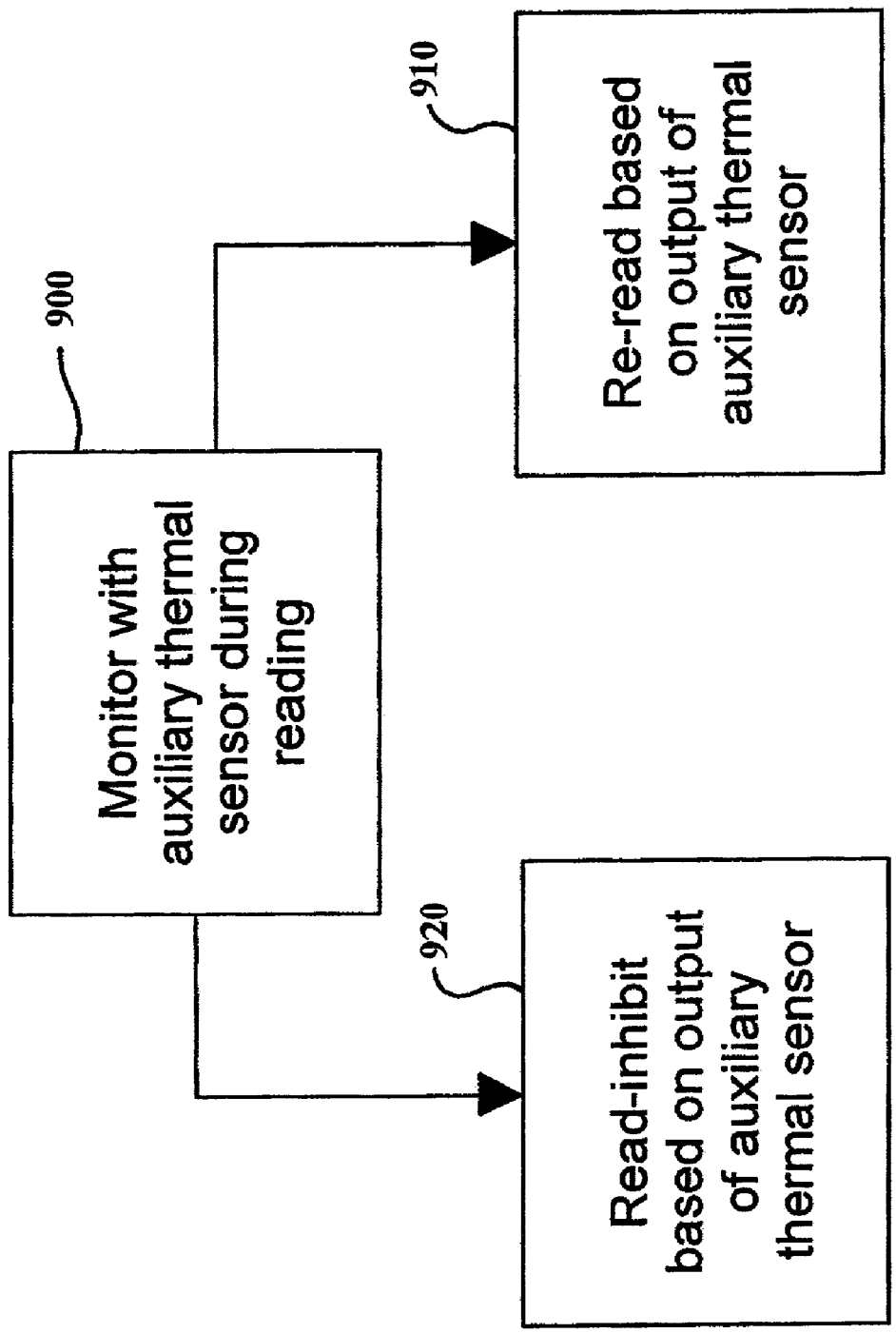
FIG. 9 is a flow diagram illustrating alternative methods of responding to disk defects and slider airbearing modulation detected using an auxiliary thermal sensor during reading according to various embodiments of the present invention.

Of course the output of the auxiliary thermal sensor may be monitored for disk defects and slider airbearing modulation while reading data as well as writing data. FIG. 9 is a flow diagram illustrating alternative methods of responding to disk defects and slider airbearing modulation detected using an auxiliary thermal sensor during reading. The output of the auxiliary thermal sensor is monitored to detect disk defects and slider airbearing modulation while reading, as denoted in block 900. Only those sectors of data where the output of the auxiliary thermal sensor indicated a problem while reading need to be re-read, as denoted in block 910. Alternatively, the read operation may be immediately stopped (i.e., a read-inhibit step) when the output of the auxiliary thermal sensor indicates a problem while reading, as denoted in block 920. This read-inhibit step (block 820) may also precede the re-read step (block 910).

The auxiliary thermal sensor may be many times wider that a conventional MR head. The width of an auxiliary thermal sensor may be made $100 \times 10^{-6}$ meters, for example, which is about 30-times wider then a typical conventional MR head in use today. The larger width of the auxiliary thermal sensor makes in-situ glide testing practical. Glide testing checks each disk surface for disk defects that may decrease the reliability of the disk drive. Disk defects include contamination, dings, scratches, and asperities. Glide testing is typically performed during manufacturing. Disks with defects are typically replaced. The auxiliary thermal sensor can easily detect disk defects. Using airbearing sliders equipped with auxiliary thermal sensors, the time required to glide test a disk drive containing six disks, spinning at 10,000 RPM, with a data zone that is $25 \times 10^{-3}$ meters is less than 20 seconds. Using airbearing sliders equipped with only conventional MR heads, which are 30-times smaller in width, the glide test would take almost 10 minutes. Still wider auxiliary thermal sensors are possible depending on the geometry of the airbearing slider. This would reduce the time to glide test even further.

Figure 10:
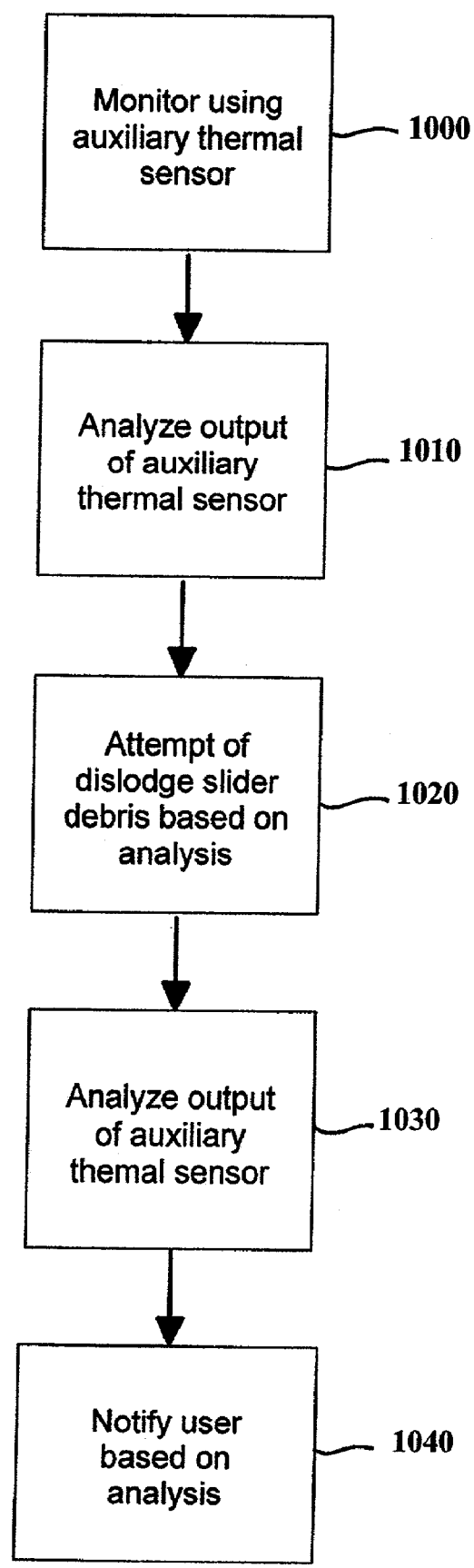
FIG. 10 is a flow diagram illustrating a slider scrub and user notification method of responding to slider airbearing modulation detected using at least one auxiliary thermal sensor according to an embodiment of the present invention.

FIG. 10 is a flow diagram illustrating a slider scrub and user notification method of responding to slider airbearing modulation detected using at least one auxiliary thermal sensor. The output of each auxiliary thermal sensor is monitored to detect slider airbearing modulation, as denoted in block 1000. With multiple auxiliary thermal sensors on an airbearing slider, a complete determination of slider dynamics can be made. For example, if an auxiliary thermal sensor is located on each of the slider side rails (e.g., 505 and 507 in FIG. 5) and also on the rear airbearing pad (e.g., 509 in FIG. 5), then simultaneous pitch, roll, and vertical translation measurements can be made. The output of each of the auxiliary thermal sensor may be analyzed (e.g., in recording channel 751 in FIG. 7) to determine pitch, roll, and vertical translation. Alternatively, the output of a single auxiliary thermal sensor may be analyzed (e.g., in recording channel 751 in FIG. 7) to determine vertical translation, for example. The analysis step, which is based on the output from one or more auxiliary thermal sensors, is denoted in block 1010.

If on the basis of the analysis, a slider is found to be flying in an unstable manner, attempts to regain a normal flying condition may be attempted, as denoted in block 1020 (e.g., recording channel 751 in FIG. 7 may communicate unsatisfactory results of the analysis over analysis line 757 to a disk drive controller, which may then initiate attempts to regain a normal flying condition). For example, the sliders may be unloaded and loaded (or stopped and started), or slow and/or fast seeks may be made while rotating the data storage disk at reduced RPM (e.g., by the disk drive controller). These scrubbing actions are performed in an effort to dislodge any debris that may be lodged on the airbearing slider. Subsequent output of the auxiliary thermal sensor(s)

may be re-analyzed (e.g., in recording channel 751 in FIG. 7) to determine if the slider has regained a normal flying condition, as denoted in block 1030. If the attempts to regain stability fail, an error code from the disk drive could be sent (e.g., by recording channel 751 in FIG. 7 over analysis line 757) to the host computer indicating that the disk drive should be replaced, as denoted in block 1040. If replacement occurs in a timely manner, it may avoid a catastrophic failure and accompanying data loss.

While this invention has been described with respect to the preferred and alternative embodiments, it will be understood by those skilled in the art that various changes in detail may be made therein without departing from the spirit, scope, and teaching of the invention. For example, the invention may be utilized in systems employing optical storage medium. Accordingly, the herein disclosed invention is to be limited only as specified in the following claims.

What is claimed is:

1. A slider assembly for a data storage device, comprising:
a slider having a leading edge and a trailing edge, the slider being configured to fly on an airbearing above a disk rotating from the leading edge to the trailing edge;
a read head mounted on the slider proximate the trailing edge;
a write head mounted on the slider proximate the trailing edge;
an auxiliary thermal sensor mounted on the slider nearer the leading edge than are the read and write heads.

2. The slider assembly as recited in claim 1, wherein the auxiliary thermal sensor is wider than the read head in a track width direction.

3. The slider assembly as recited in claim 2, wherein the auxiliary thermal sensor is at least about 30 times wider than the read head.

4. The slider assembly as recited in claim 1, wherein the auxiliary thermal sensor includes an MR stripe.

5. The slider assembly as recited in claim 4, wherein the read head is an MR head or a GMR head, and wherein the write head is an inductive head.

6. The slider assembly as recited in claim 1, wherein the slider includes a rear airbearing pad having a forward edge and a rearward edge, and wherein at least one of the read and write heads is mounted at the rearward edge of the rear airbearing pad and the auxiliary thermal sensor is mounted at the forward edge of the rear airbearing pad.

7. The slider assembly as recited in claim 6, wherein the auxiliary thermal sensor is mounted at the forward edge of the rear airbearing pad at least about $250 \times 10^{-6}$ meters ahead of the at least one head mounted at the rearward edge of the rear airbearing pad.

8. The slider assembly as recited in claim 1, further comprising a second auxiliary thermal sensor mounted on the slider nearer the leading edge than are the read and write heads.

9. The slider assembly as recited in claim 8, wherein the slider includes a pair of airbearing side rails extending at least partially between the leading and trailing edges of the slider, and wherein the auxiliary thermal sensors are respectively mounted on the airbearing side rails.

10. A data storage device, comprising;
a data storage disk;
a slider having a leading edge and a trailing edge, the slider being configured to fly on an airbearing above a disk rotating from the leading edge to the trailing edge;
a read head mounted on the slider proximate the trailing edge;
a write head mounted on the slider proximate the trailing edge;
an auxiliary thermal sensor mounted on the slider nearer the leading edge than are the read and write heads;
an actuator provided to position the heads relative to the data storage disk; a motor provided to rotate the data storage disk relative to the slider.

11. The data storage device as recited in claim 10, wherein the auxiliary thermal sensor is wider than the read head in a track width direction.

12. The data storage device as recited in claim 11, wherein the auxiliary thermal sensor is at least about 30 times wider than the read head.

13. The data storage device as recited in claim 10, wherein the auxiliary thermal sensor includes an MR stripe.

14. The data storage device as recited in claim 13, wherein the read head is an MR head or a GMR head, and wherein the write head is an inductive head.

15. The data storage device as recited in claim 10, wherein the slider includes a rear airbearing pad having a forward edge and a rearward edge, and wherein at least one of the read and write heads is mounted at the rearward edge of the rear airbearing pad and the auxiliary thermal sensor is mounted at the forward edge of the rear airbearing pad.

16. The data storage device as recited in claim 15, wherein the auxiliary thermal sensor is mounted at the forward edge of the rear airbearing pad at least about $250 \times 10^{-6}$ meters ahead of the at least one head mounted at the rearward edge of the rear airbearing pad.

17. The data storage device as recited in claim 10, further comprising a second auxiliary thermal sensor mounted on the slider nearer the leading edge than are the read and write heads.

18. The slider assembly as recited in claim 17, wherein the slider includes a pair of airbearing side rails extending at least partially between the leading and trailing edges of the slider, and wherein the auxiliary thermal sensors are respectively mounted on the airbearing side rails.

19. An arm electronics module for a data storage device, comprising:
a write driver that provides a write current to a write head based on encoded data provided by a recording channel;
a preamplifier that provides a read signal by maintaining one of a constant current or a constant voltage for a read head and amplifying changes in the other of the current or voltage of the read head as a data storage disk is rotated thereunder;
an amplifier that provides a thermal sensor output by maintaining one of a constant current or a constant voltage for an auxiliary thermal sensor and amplifying changes in the other of the current or voltage of the auxiliary thermal sensor as changes in flyheight occur between the auxiliary thermal sensor and the data storage disk as the data storage disk is rotated thereunder.
wherein the amplifier provides the thermal sensor output to the recording channel.

20. The arm electronics module as recited in claim 19, wherein the recording channel performs an analysis of the thermal sensor output.

21. The arm electronics module as recited in claim 19, wherein the preamplifier provides the read signal to the recording channel at the same time the amplifier provides the thermal sensor output to the recording channel.

22. The arm electronics module as recited in claim 19, wherein the write driver provides the write current to the write head at the same time as the amplifier provides the thermal sensor output to the recording channel.

23. An arm electronics module for a data storage device, comprising:
- driving means for providing a write current to a write head based on encoded data provided by a recording channel;
- preamplifying means for amplifying changes in at least one of current and voltage of a read head as a data storage disk is rotated thereunder to thereby provide a read signal;
- amplifying means for amplifying changes in at least one of current and voltage of an auxiliary thermal sensor as changes in flyheight occur between the auxiliary thermal sensor and the data storage disk as the data storage disk is rotated thereunder to thereby provide a thermal sensor output;
- wherein the amplifying means provides the thermal sensor output to the recording channel.

24. The arm electronics module as recited in claim 23, wherein the recording channel performs an analysis of the thermal sensor output.

25. The arm electronics module as recited in claim 23, wherein the preamplifying means provides the read signal to the recording channel at the same time the amplifying means provides the thermal sensor output to the recording channel.

26. The arm electronics module as recited in claim 23, wherein the driving means provides the write current to the write head at the same time as the amplifying means provides the thermal sensor output to the recording channel.

27. A data storage device, comprising;
- a data storage disk;
- a slider having a leading edge and a trailing edge, the slider being configured to fly on an airbearing above a disk rotating from the leading edge to the trailing edge;
- a read head mounted on the slider proximate the trailing edge;
- a write head mounted on the slider proximate the trailing edge;
- an auxiliary thermal sensor mounted on the slider nearer the leading edge than are the read and write heads;
- an actuator provided to position the heads relative to the data storage disk;
- a motor provided to rotate the data storage disk relative to the slider;
- a write driver that provides a write current to the write head based on encoded data provided by a recording channel;
- a preamplifier that provides a read signal by maintaining one of a constant current or a constant voltage for the read head and amplifying changes in the other of the current or voltage of the read head as the data storage disk is rotated thereunder;
- an amplifier that provides a thermal sensor output by maintaining one of a constant current or a constant voltage for the auxiliary thermal sensor and amplifying changes in the other of the current or voltage of the auxiliary thermal sensor as changes in flyheight occur between the auxiliary thermal sensor and the data storage disk as the data storage disk is rotated thereunder.

28. The arm electronics module as recited in claim 27, wherein the amplifier provides the thermal sensor output to the recording channel.

29. The arm electronics module as recited in claim 28, wherein the recording channel performs an analysis of the thermal sensor output.

30. The arm electronics module as recited in claim 28, wherein the preamplifier provides the read signal to the recording channel at the same time the amplifier provides the thermal sensor output to the recording channel.

31. The arm electronics module as recited in claim 28, wherein the write driver provides the write current to the write head at the same time as the amplifier provides the thermal sensor output to the recording channel.

* * * * *